Patented Oct. 19, 1948

2,452,007

UNITED STATES PATENT OFFICE 2,452,007

THERMOSTATIC REGULATION FOR ENGINE COOLING

Thelbert L. Weybrew, Pittsburgh, Pa., assignor to Westinghouse Electric Corporation, East Pittsburgh, Pa., a corporation of Pennsylvania Application October 12, 1945, Serial No. 622,050

5 Claims. (Cl. 123—178)

My invention relates, generally, to locomotive control systems and, more particularly, to systems for controlling the operation of the radiator fan motor of a self-propelled locomotive of the Diesel-electric type.

In a Diesel-electric locomotive the water and lubricating oil radiators of the Diesel engine are cooled by air circulated by a fan, driven either by a belt from the engine or by an electric motor. In either case it is necessary to vary the amount of air circulated in accordance with the cooling requirements of the engine, which vary with the load and the outside temperature. When a belt-driven fan is utilized, the variation in air circulated is obtained by adjustable shutters. The degree of opening of the shutters is determined by the water temperature. Although declutching mechanisms have been provided, these frequently fail to function properly and the fan usually runs continuously, resulting in a waste of power when cooling is not required.

An object of my invention, generally stated, is to provide a fan motor control system which shall be simple and efficient in operation and which may be economically manufactured and installed.

A more specific object of my invention is to vary the speed of an engine radiator fan motor in accordance with the cooling requirements of the engine.

Another object of my invention is to provide for thermostatically controlling the speed of a radiator fan motor.

Other objects of my invention will be explained fully hereinafter or will be apparent to those skilled in the art.

In accordance with one embodiment of my invention, power for the radiator fan motor is supplied by a generator, driven by the engine of a locomotive. This generator is separately excited, therefore, its voltage and output are proportional to the engine speed. Since the engine requires proportionally less cooling at reduced speeds, the present system automatically circulates less air because the voltage of the fan generator is reduced at partial speed. Thermostats are also provided to control the fan motor speed in accordance with the water temperature.

For a fuller understanding of the nature and objects of my invention, reference may be had to the following detailed description, taken in conjunction with the accompanying drawing, in which.

Figure 1:
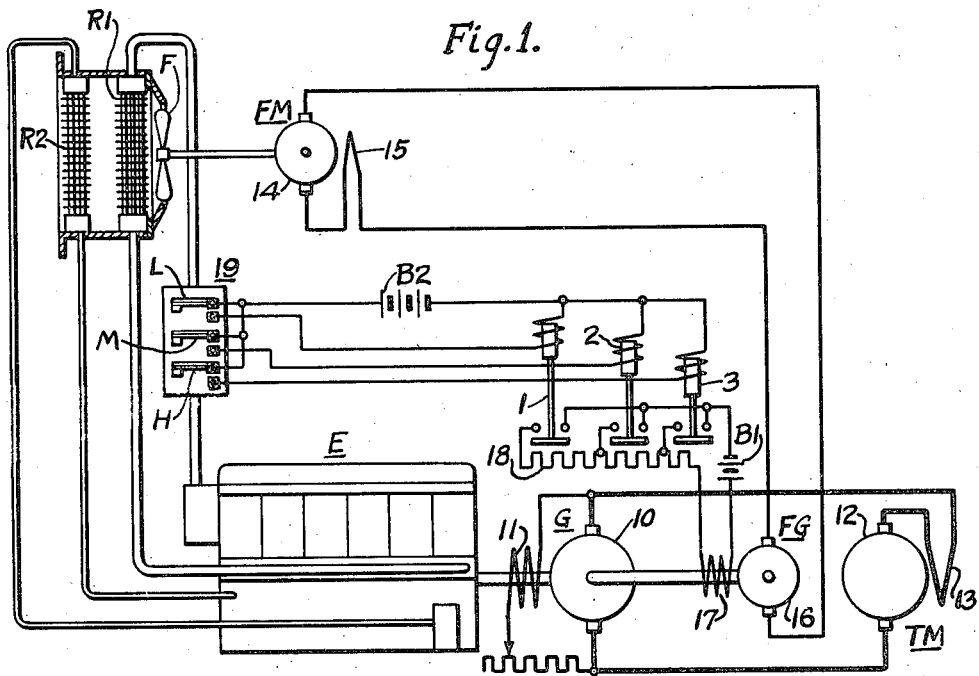
Figure 1 is a diagrammatic view of a control system embodying my invention.

Referring to the drawing, and particularly to Fig. 1, the system shown therein comprises an engine E which drives a main generator G and a fan generator FG. The main generator G supplies current for a traction motor TM which may be of a type suitable for propelling a locomotive (not shown). The fan generator FG supplies current for a fan motor FM which drives a fan F for circulating air through radiators R1 and R2 for cooling the water and lubricating oil, respectively, for the engine E.

The main generator G may be of the shunt type, having an armature winding 10 and a shunt field winding 11. The traction motor TM may be of the series type, having an armature winding 12 and a series field winding 13. The fan motor FM is preferably of the series type, having an armature winding 14 and a series field winding 15. The fan generator FG is preferably separately excited, having an armature winding 16 and a field winding 17 which is excited from a battery B1 through a resistor 18.

As explained hereinbefore, it is necessary to vary the amount of air circulated through the radiators R1 and R2 to match the requirements of the engine which vary with the load and with outside temperature. In the present system, this is accomplished by varying the speed of the fan motor FM by controlling the excitation of the fan generator FG by means of temperature responsive devices 19 which may be disposed in the cooling system for the engine E. Three values of excitation for the fan generator FG are obtained by controlling the operation of switches 1, 2 and 3 by means of the thermostats L, M and H, respectively.

These thermostats are so constructed that they close their contact members in succession as the coolant temperature in jackets of engine E increases. Thus, when the thermostat L closes its contact members, the actuating coil of the switch 1 is energized from a battery B2 and the switch is closed to connect the field winding 17 across the battery B1 in series with the resistor 18. In this manner, the generator FG is excited at a low value, and the fan motor FM runs at approximately ⅓ speed.

If the thermostat M closes its contact members because of a slightly higher coolant temperature, the switch 2 is closed to shunt a portion of the resistor 18 from the circuit for the field winding 17, thereby increasing the excitation of the generator FG and raising its voltage. The increased voltage on the fan motor FM raises its speed to about ⅔ full speed. Full speed results from a similar sequence of events when the thermostat H closes its contact members to cause the closing of the switch 3 to shunt an additional portion of the resistor 18 from the circuit for the field winding 17.

In this manner, the speed of the fan motor FM and hence the amount of air circulated through the radiators is varied in accordance with the cooling requirements of the engine E. This system has the advantage of a relatively high efficiency of operation since the only resistance power loss is in the resistor 18 for the field winding of the fan generator FG. This loss is less than 1% of the capacity of the fan motor FM.

Figure 2:
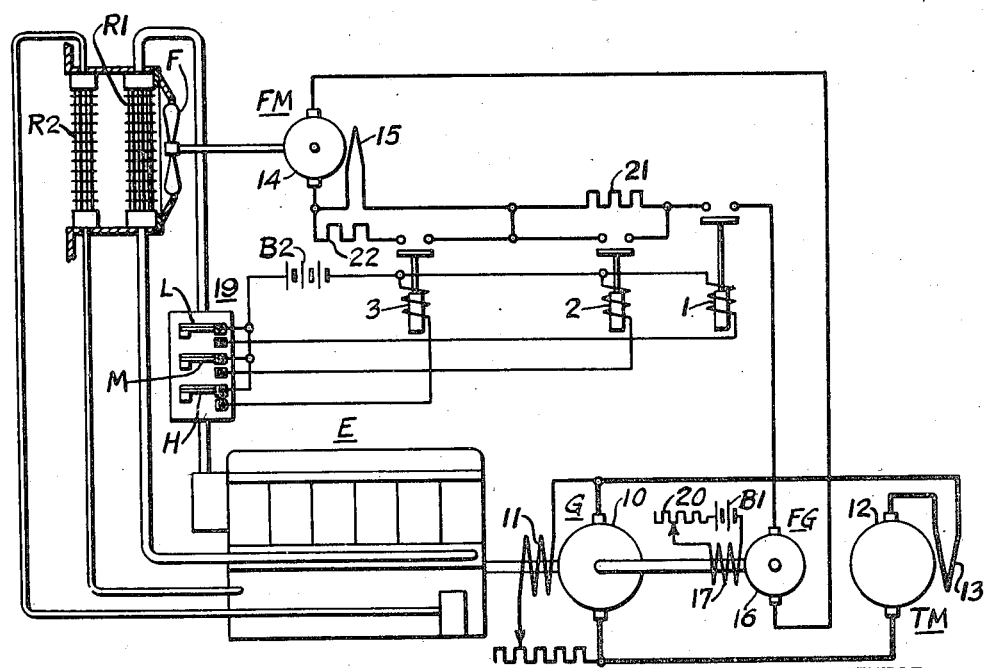
Fig. 2 is a diagrammatic view of a modification of the invention.

While the system shown in Fig. 1 is highly efficient in operation, it can be utilized only when auxiliary apparatus on a locomotive, such as the traction motor blowers, is not supplied with current from the fan generator FG. The system shown in Fig. 2 can be utilized when apparatus other than the fan motor FM is supplied with current from the fan generator FG. In this system, the field winding 17 of the fan generator is constantly excited from the battery B1. The excitation current may be adjusted by means of a rheostat 20. Therefor the voltage and output of the generator FG are proportional to the engine speed.

The speed of the fan motor FM is controlled by switches 1, 2 and 3, a resistor 21 which is connected in series-circuit relation with the fan motor FM, and a resistor 22 which may be connected in parallel-circuit relation to the field winding 15 of the fan motor. The operation of the switches 1, 2 and 3 is controlled by thermostats L, M and H, respectively.

When the thermostat L closes its contact members, the switch 1 is closed to connect the motor FM across the generator FG in series with the resistor 21. The fan motor then operates at a relatively low speed and the air delivered to the radiators is approximately ⅓ of the full capacity. When the thermostat M closes its contact members because of an increase in the temperature of the cooling fluid, the switch 2 is closed to shunt the resistor 21 from the motor circuit, thereby increasing the speed of the fan motor which now delivers approximately ⅔ of the full amount of air. When the thermostat H closes its contact members because of a still higher temperature of the cooling fluid, the switch 3 is closed to shunt the field winding 15 of the motor FM through the resistor 22, thereby increasing the speed of the fan motor still further. At this speed, the fan delivers 100% of air to the radiators.

Under normal operating conditions, the high speed connection for the fan motor FM is required only when the locomotive is operating under full load and on the few very hot days of the year. At all other times, the fan motor operates in the lower speed connections with a correspondingly reduced power input and improved locomotive efficiency.

It will be noted that this system protects the fan motor FM because it is never first connected to the fan generator at full voltage. Its speed is increased step-by-step with increasing temperature and reduced by steps with decreasing temperature.

Both of the systems herein described have the advantage of automatically circulating less air as the engine speed is reduced and consequently requires proportionally less cooling. Since the voltage of the fan generator FG is reduced at partial engine speeds, the speed of the fan motor FM and the amount of air circulated are correspondingly reduced.

The systems herein described improve the overall efficiency of a Diesel-electric locomotive and reduce locomotive maintenance since relatively simple apparatus and machines are utilized. Furthermore, the present systems are readily adaptable to varying operating requirements since the fan speed can be easily adjusted by adjusting the excitation of the fan generator.

Since numerous changes may be made in the above-described construction and different embodiments of the invention may be made without departing from the spirit and scope thereof, it is intended that all matter contained in the foregoing description or shown in the accompanying drawing shall be considered as illustrative and not in a limiting sense.

I claim as my invention:

1. In a system for controlling the temperature of an internal combustion engine having a radiator for cooling fluid and a plurality of temperature responsive devices disposed to operate successively, in combinaton, a fan motor, a generator driven by the engine to supply power to the fan motor, the voltage of said generator normally being proportional to the engine speed, a plurality of resistors, and a plurality of switches operable successively under the control of said temperature responsive devices and cooperating with said resistors to vary the voltage applied to and the speed of the fan motor.

2. In a system for controlling the temperature of an internal combustion engine having a radiator for cooling fluid and a plurality of temperature responsive devices disposed to operate successively, in combination, a fan motor, a generator driven by the engine to supply power to the fan motor, a plurality of resistors, and a plurality of switches operable successively under the control of said temperature responsive devices and cooperating with said resistors to vary the voltage applied to the fan motor by said generator.

3. In a system for controlling the temperature of an internal combustion engine having a radiator for cooling fluid and a plurality of temperature responsive devices disposed to operate successively, in combination, a fan motor, a generator driven by the engine to supply power to the fan motor, said generator being separately excited, and a plurality of switches operable successively under the control of said temperature responsive devices to vary the voltage applied to and the speed of the fan motor.

4. In a system for controlling the temperature of an internal combustion engine having a radiator for cooling fluid and a plurality of temperature responsive devices disposed to operate successively, in combination, a fan motor, a generator driven by the engine to supply power to the fan motor, said generator having a voltage proportional to the engine speed, a plurality of resistors disposed externally of the fan motor, and a plurality of switches operable successively under the control of said temperature responsive devices and cooperating with said resistors to vary the voltage applied to and the speed of the fan motor.

5. In a system for controlling the temperature of an internal combustion engine having a radiator for cooling fluid and a plurality of temperature responsive devices disposed to operate successively, in combination, a fan motor, a generator driven by the engine to supply power to the fan motor, a plurality of resistors for controlling the generator voltage by varying its exciting current, and a plurality of switches operable successively under the control of said temperature responsive devices for shunting said resistors to vary the voltage applied to and the speed of the fan motor.

THELBERT L. WEYBREW.

REFERENCES CITED

The following references are of record in the file of this patent:

UNITED STATES PATENTS

| Number    | Name     | Date          |
|-----------|----------|---------------|
| 1,664,317 | Pabodie  | Mar. 27, 1928 |
| 1,900,586 | Rippe    | Mar. 7, 1933  |
| 2,019,476 | Brownlee | Nov. 5, 1935  |
| 2,195,924 | Hoesel   | Apr. 2, 1940  |
| 2,244,172 | Novak    | June 3, 1941  |
| 2,273,000 | Hans     | Feb. 10, 1942 |
| 2,360,071 | Noll     | Oct. 10, 1944 |